(12) United States Patent
Yang et al.

(10) Patent No.: US 8,722,258 B2
(45) Date of Patent: May 13, 2014

(54) OPEN TYPE FUEL CELL SYSTEM

(75) Inventors: Cheol Nam Yang, Changwon-si (KR); Yong-Soo Jeong, Changwon-si (KR); Chang Rae Lee, Changwon-si (KR); Sung-Mo Moon, Changwon-si (KR)

(73) Assignee: Korea Institute of Machinery & Materials, Daejon (KR)

( * ) Notice: Subject to any disclaimer, the term of this patent is extended or adjusted under 35 U.S.C. 154(b) by 249 days.

(21) Appl. No.: 13/322,558

(22) PCT Filed: Oct. 20, 2009

(86) PCT No.: PCT/KR2009/006065
§ 371 (c)(1),
(2), (4) Date: Nov. 26, 2011

(87) PCT Pub. No.: WO2010/137775
PCT Pub. Date: Dec. 2, 2010

(65) Prior Publication Data
US 2012/0171582 A1  Jul. 5, 2012

(30) Foreign Application Priority Data
May 27, 2009  (KR) .................. 10-2009-0046382

(51) Int. Cl.
*H01M 8/06* (2006.01)
*H01M 8/04* (2006.01)

(52) U.S. Cl.
CPC ...... *H01M 8/04097* (2013.01); *H01M 8/04141* (2013.01); *H01M 8/04164* (2013.01); *H01M 8/0662* (2013.01); *H01M 8/04201* (2013.01); *H01M 8/04291* (2013.01); *Y02E 10/00* (2013.01)

USPC ......... 429/413; 429/408; 429/410; 429/411; 429/412; 429/414; 429/415; 429/427

(58) Field of Classification Search
CPC .............. H01M 8/04089; H01M 8/04097; H01M 8/04141; H01M 8/04156; H01M 8/04164; H01M 8/042; H01M 8/4291; H01M 8/04552; H01M 8/04559; H01M 8/0662; Y02E 60/50
USPC ................ 429/429, 410–415, 427, 408
See application file for complete search history.

(56) References Cited

U.S. PATENT DOCUMENTS

2006/0280976 A1* 12/2006 Hashigaya et al. ........... 429/22

FOREIGN PATENT DOCUMENTS

| JP | 2005-158501 | 6/2005 | |
|---|---|---|---|
| JP | 2005-268056 | 9/2005 | |
| JP | 2007-280705 | 10/2007 | |
| JP | 2008-251312 | * 10/2008 | ......... H01M 8/06 |

* cited by examiner

*Primary Examiner* — Patrick Ryan
*Assistant Examiner* — Ben Lewis
(74) *Attorney, Agent, or Firm* — Julio M. Loza; Loza & Loza, LLP

(57) ABSTRACT

An open type fuel cell system is provided including a recirculating unit that recirculates hydrogen discharged from a main fuel cell into the main fuel cell and a reproducing unit that removes water and impurities produced in operation of the main fuel cell. The open type fuel cell system is adapted so that it does not discharge hydrogen supplied to a main fuel cell into the atmosphere.

13 Claims, 2 Drawing Sheets

OPEN TYPE FUEL CELL SYSTEM

CROSS-REFERENCE TO RELATED APPLICATIONS

This application is the U.S. national stage of International Patent Application No. PCT/KR2009/006065, filed on Oct. 20, 2009, which claims the benefit of priority from Korean Patent Application No. 10-2009-0046382, filed May 27, 2009. The disclosures of the foregoing applications are incorporated herein by reference in their entirety.

BACKGROUND OF THE INVENTION

1. Field of the Invention

The present invention relates to an open type fuel cell system.

2. Description of the Related Art

Fuel cells are systems that generate electricity, using reaction between fuel (LNG, LGP, hydrogen, and methanol) and oxygen, and produces water and heat as byproducts, and which are electric generation devices having high electric generation efficiency without factors polluting the environment.

The fuel cells are classified into a polymer electrolyte membrane fuel cell (PEMFC), a direct methanol fuel cell (DMFC), a phosphoric acid fuel cell (PAFC), a molten carbonate fuel cell (MCFC), a solid oxide fuel cell (SOFC), and the like, in accordance with the types of electrolytes.

The PEMFC, PAFC, and DMFC in the fuel cells has low operation temperatures of 80 to 120° C., 190 to 200° C., and 25 to 90° C., respectively, and useful for the power sources of transport, such as vehicles, home, and portable devices.

Therefore, researches of reducing the size, weight, and cost of the entire fuel cell systems have been conducted to advance and increase common use of the fuel cells.

However, a large amount of byproducts are produced in an operation environment at a high-current region in the fuel cells and supply of gas to the catalytic layer and dispersion of protons to the polymer film are prevented by droplets of excessive water, such that the performance of the fuel cells is deteriorated.

It is more serious that it is difficult to implement normal operation by reduction of performance of some cells due to non-uniform distribution of water in unit cells disposed in the fuel cells.

As described above, the excessive water produced in the fuel cells, that is, flooding is an important factor that makes normal operation of the fuel cells difficult, in addition to reducing reaction efficiency, it is necessary to discharge the excessive water outside the fuel cells.

Accordingly, "a method and device for performing internal purge in fuel cell system" is disclosed in Korean Patent No. 0509818.

The related art is briefly described. Voltages of a plurality of cells are sensed, water and gas mixture in a stack is purged outside the stack by using a pressure difference, by controlling a purge valve and a recirculation pump when flooding occurs, and the gas separated from the water can be re-supplied to the stack.

However, the related art described above has the following problems.

That is, since the degree of purity of the fuel supplied to the fuel cell cannot be 100%, impurities accumulate in the fuel cell even if the gas separated from the water is re-supplied to the fuel cell, such that electric generation efficiency is reduced.

Further, when carbon of the separator and electrodes in the fuel cell and impurities, such as metal ions and particles of the peripheral components of the fuel cell accumulate, durability of the fuel cell is gradually influenced and current leaks in the cell, which reduces the life span or damages the fuel cell causes a large amount of repairing charges, and this is not preferable.

Further, even if the water produced in the fuel cell is removed by recirculating the gas in the fuel cell by using the related art, the impurities flow back into the fuel cell by the gas supplied to the fuel cell, because it is a closed circuit, such that performance and durability of the fuel cell are reduced.

On the other hand, in a common open type fuel cell system without an internal purge, carefulness is required to use the fuel cell system in a closed space for a long time due to the risk of explosion of hydrogen that does not react in the fuel cell and is discharged into the atmosphere.

SUMMARY OF THE INVENTION

The present invention has been made in an effort to provide an open type fuel cell system including a recirculating unit that recirculates hydrogen discharged from a main fuel cell into the main fuel cell and a reproducing unit that removes water and impurities produced in operation of the main fuel cell.

The present invention provides an open type fuel cell system that does not discharge hydrogen supplied to a main fuel cell into the atmosphere.

An aspect of the present invention provides an open type fuel cell system including: a main fuel cell that generates electricity by reacting hydrogen with the oxygen in the air; a supply unit that supplies the hydrogen and the air to the main fuel cell; a recirculating unit that recirculates hydrogen discharged from the main fuel cell to the main fuel cell; a sensing unit that senses voltage of a plurality of cells in the main fuel cell; a reproducing unit that selectively communicates with a side of the main fuel cell and removes water and impurities in the main fuel cell; a humidifying unit that supplies the water in the air discharged from the main fuel cell to the main fuel cell; and a control unit that controls the operations of the supply unit, the recirculating unit, the sensing unit, the reproducing unit, and the humidifying unit, in which the reproducing unit includes: a reproducing pipe that guides the flow direction of the hydrogen passing through the main fuel cell; a reproducing valve that selectively closes the reproducing pipe; a sacrifice fuel cell that produces water by reacting the hydrogen supplied from the reproducing pipe with air therein; an air intake pipe that guides air flowing into the sacrifice fuel cell; and a water collecting unit that collects the water produced in the sacrifice fuel cell.

The reproducing unit discharges the water and impurities in the main fuel cell by changing the flow speed of the hydrogen and air discharged without reacting from the main fuel cell.

The recirculating unit includes: a gas-liquid separator that separate hydrogen and water produced in the main fuel cell; a recirculating pipe that guides the hydrogen separated from the water by the gas-liquid separator to the main fuel cell; and a recirculating pump that forces the flow of the hydrogen in the recirculating pipe.

The reproducing pipe and the recirculating pipe communicate with each other.

The water collecting unit and the gas-liquid separator selectively communicate with a water tank storing water.

The sacrifice fuel cell generates electricity by receiving hydrogen and air and a pair of electrodes that guide current flow are selectively connected.

The sacrifice fuel cell has capacity of electric generation smaller than the main fuel cell and is selective replaced.

A switch that selectively connects/disconnects a pair of electrodes is disposed at a side of the sacrifice fuel cell and the switch is connected when the reproducing valve is opened.

The supply unit includes: a fuel tank that stores hydrogen and selectively supplies air; and an air supplier that forces the external air to flow into the main fuel cell.

A check valve that blocks the flown of the air in one direction is disposed at a side of the recirculating pipe.

The control unit opens the reproducing pipe, when one or more of the voltages of the plurality of cells are lower than a predetermined voltage.

A drain that controls a water level by selectively discharge the water stored in the gas-liquid separator is disposed at a side of the gas-liquid separator.

The humidifying unit includes: a humidifying pipe that guides moist air discharged from the gas-liquid separator into a humidifier that supplies hydrogen and air humidified in the main fuel cell; and a humidification control valve that selectively closes the humidifying pipe.

An exhaust port is disposed at a side of the sacrifice fuel cell and the humidifier, respectively.

According to the present invention, the recirculating unit that recirculates the hydrogen discharged from the main fuel cell to the main fuel cell and the reproducing unit that removes the water and impurities in the main fuel cell when the efficiency of electric generation of the main fuel cell is reduced are provided.

Therefore, it is possible to maximize the fuel efficiency and maximize the efficiency of electric generation of the main fuel cell, using the operation of the reproducing unit.

Further, the sacrifice fuel cell in the reproducing unit can be selectively replaced in the present invention.

Therefore, it is possible to selectively increase the efficiency of electric generation by selectively reproducing the main fuel cell when the efficiency of electric generation of the main fuel cell is reduced, such that it is possible to improve the durability of the main fuel cell.

Further, since the sacrifice fuel cell can be selectively replaced, it is possible to easily maintain the main fuel cell and easily repair the sacrifice fuel cell.

Further, it is possible to operate the fuel cell system in a room and improve stability, without discharging a small amount of hydrogen that is simultaneously discharged to discharge the water in the fuel cell in a fuel cell system of the related art.

DETAILED DESCRIPTION OF THE PREFERRED EMBODIMENTS

The configuration of an open type fuel cell system according to an exemplary embodiment of the present invention is described with reference to the accompanying drawings.

Figure 1:
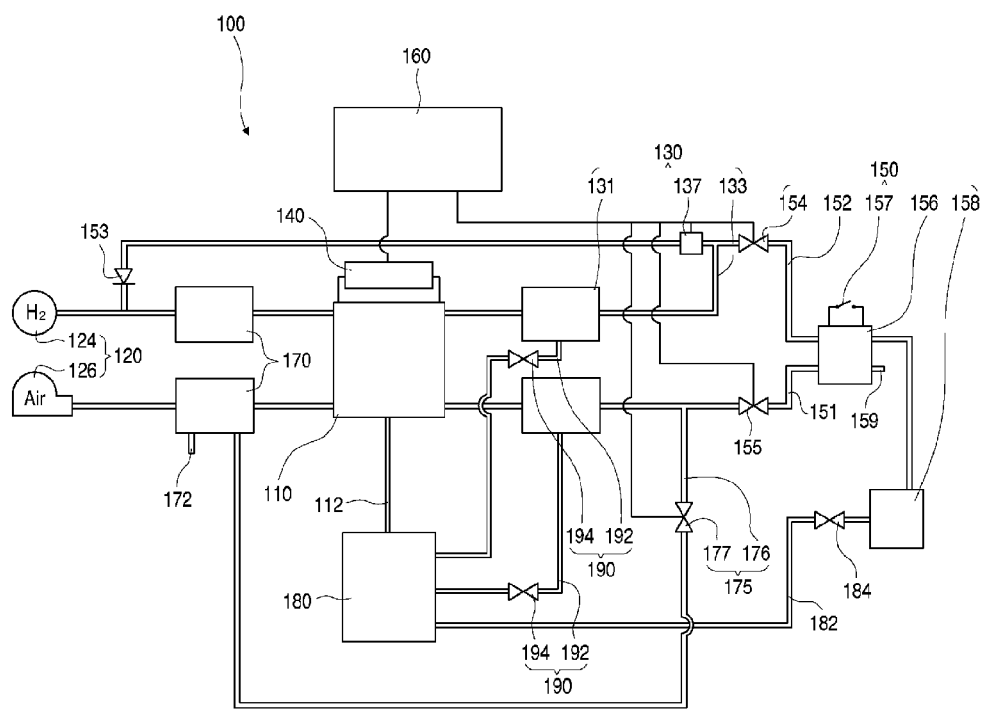
FIG. 1 is a view showing the configuration of an open type fuel cell system according to an exemplary embodiment of the present invention.

FIG. 1 is a view showing the configuration of an open type fuel cell system according to an exemplary embodiment of the present invention.

As shown in the figure, an open type fuel cell system 100 has a configuration of supplying air and hydrogen $H_2$ that is fuel and generates electricity by reacting hydrogen $H_2$ and oxygen $O_2$.

In order to achieve this configuration, the open type fuel cell system includes: a main fuel cell 110 that generates electricity by reacting hydrogen and the oxygen in the air; a supply unit that supplies the hydrogen and air to the main fuel cell; a recirculating unit 130 that recirculates hydrogen discharged from the main fuel cell to the main fuel cell; a sensing unit 140 that sense voltages of a plurality of cells in the main fuel cell; a reproducing unit 150 that selectively communicates with a side of the main fuel cell and removes water an impurities in the main fuel cell; a humidifying unit 175 that supplies water in the air discharged from the main fuel cell to the main fuel cell; and a control unit 160 that controls the operations of the supply unit, recirculating unit, sensing unit, reproducing unit, and humidifying unit.

Further, the open type fuel system 100 is a system that can be applied to devices that are used in a space exposed to the atmosphere, such as a vehicle, generates electricity by supplying hydrogen and air, and discharges water and air.

Therefore, various fuel cells may be selectively used as the main fuel cell 110 as long as it is possible to receive hydrogen and oxygen that are fuel and generate electricity.

That is, the supply unit 120 is provided to supply a gas containing hydrogen and oxygen to the main fuel cell 110 and includes a fuel tank 124 that stores and selectively supplies hydrogen and an air supplier 126 that supplies the external air into the main fuel cell 110 in an exemplary embodiment of the present invention.

The air supplier 136 is an air blower or an air compressor, which strongly supplies the external air to the main fuel cell 110 after sucking the external air.

The open type fuel cells system 100 may be used for a device that is used while being exposed to the outside, such as a vehicle.

Therefore, only the hydrogen in the air supplied by the air supplier 126 reacts and the others flow outside, after the air is supplied into the main fuel cell 110.

The fuel tank 124 and the air supplier 126 communicate with the humidifier 170 and the humidifier 170 communicates with the main fuel cell 110. Therefore, the hydrogen and air in the fuel tank 124 and the air supplier 126 are supplied into the main fuel cell 110 after being humidified through the humidifier 170.

The humidifier 170 is provided such that the fuel and air supplied in the main fuel cell 110 can react well, and a first exhaust port 172 is disposed at the lower portion of the humidifier 170 connected with the air supplier 126.

The first exhaust port 172 is provided such that moist air flowing into the humidifier 170 by the humidifying unit 175 is discharged to the outside through the humidifier 170.

The sensing unit 140 is disposed above the main fuel cell 110. The sensing unit 140 is disposed to sense voltages of a plurality of cells in the main fuel cell 110.

That is, the main fuel cell 110 generates high voltage by stacking a plurality of cells, and as the cells are used for a long period of time, different voltages are generated by differences in current flux and the amount of water generated in the cells, such that differences are generated among the cells.

Therefore, the sensing unit 140 is provided too measure and diagnoses in advance differences in current flux and the amount of water even while the main fuel cell 110 operates.

The recirculating unit 130 is disposed at the right side of the sensing unit 140. The recirculating unit 130 is provided to maximize coefficient of utilization of the fuel by recirculating the hydrogen discharged without reacting in the main fuel cell 110 to the main fuel cell 110.

For this configuration, the recirculating unit 130 includes a gas-liquid separator 131 that separates water, which is produced in reaction of oxygen and hydrogen, and non-reacting hydrogen in the main fuel cell 110, a recirculating pipe 133 that guides the hydrogen separated from the water in the gas-liquid separator 131 to the main fuel cell 110, and a recirculating pump 137 that forces the flow of gas in the recirculating pipe 133.

The recirculating unit 130 communicates with the gas-liquid separator 131 and the humidifier 170 at both ends, such that it can recirculate the non-reacting hydrogen flowing out of the main fuel cell 110 into the main fuel cell 110.

A check valve 153 is disposed at a side of the recirculating pipe 133. The check valve 153 blocks the hydrogen supplied from the fuel tank 124 such that the hydrogen cannot flow into the recirculating pipe 133, and forces the recirculating gas (hydrogen) supplied to the front end of the main fuel cell 110 by the recirculating pump 137 to flow into the humidifier 170.

Further, a drain 190 is disposed at the lower portion of the gas-liquid separator 131. The drain 190 guides water into a water tank 180, when water discharged from the main fuel cell 110 increases above an appropriate level in the gas-liquid separator 131.

For this configuration, the drain 190 includes a drain pipe 192 making the gas-liquid separator 131 communicate with the water tank 180 and a drain valve 194 selectively closes the drain pipe 192.

Therefore, as the drain valve 194 is closed and opened, the water in the gas-liquid separator 131 flows into the water tank 180 through the drain pipe 192, such that the water level in the gas-liquid separator 131 can be kept constant.

The reproducing unit 150 that is a main component of the present invention is disposed at the right side of the recirculating unit 130. The reproducing unit 150 allows the impurities in the main fuel cell 110 to be discharged to the outside by temporarily changing the flow of gas flowing in the recirculating pipe 133, when the voltages of the cells in the main fuel cell 110 which are sensed by the sensing unit 140 are lower than a predetermined voltage.

For this configuration, the reproducing unit 150 includes a reproducing pipe 152 that guides the flow direction of the hydrogen passing through the recirculating unit 130, a reproducing valve 154 that selectively blocks the reproducing pipe 152, a sacrifice fuel cell 156 that produces water by reacting the hydrogen supplied from the reproducing pipe 152 with air, and a water collecting unit 158 that collects water produced in the sacrifice fuel cell 156.

The reproducing pipe 152 diverging from a side of the recirculating pipe 133 and communicates with the sacrifice fuel cell 156, and guides the flow of gas by the operation of the reproducing valve 154.

Therefore, the sacrifice fuel cell 156 can receive hydrogen when the reproducing valve 154 is open.

The sacrifice fuel cell 156 selectively operates when the performance is deteriorated by the water in the main fuel cell 110 or in order to discharge impurities, as can be seen from the name, and has capacity of electric generation smaller than the main fuel cell 110 and can be selectively replaced.

That is, the sacrifice fuel cell 156 generates electricity by receiving hydrogen and air and has a switch 157 at a side of a pair of electrodes guiding the flow of current to be selective connected. Further, the gas discharged from the main fuel cell 110 is consumed in the sacrifice fuel cell 156 by the connection of the switch 157 into water while the other impurities accumulate in the sacrifice fuel cell 156.

Further, the supplied non-reacting gas is changed into water while the impurities are absorbed and accumulated, by electric connection in the sacrifice fuel cell 156. Therefore, the sacrifice fuel cell 156 collects a small amount of impurities in the reacting gas supplied to increase durability of the main fuel cell 110 and the impurities in a close type fuel cell system.

Accordingly, the sacrifice fuel cell 156 is exposed to a severe environment even though protecting the main fuel cell 110 and increasing the durability, such that it may be periodically replaced.

Meanwhile, the operations of the sensing unit 140, recirculating pump 137, reproducing valve 154, and switch 157 are controlled by the control unit 160.

That is, the control unit 160 operates the reproducing unit 150, when one or more of the voltages of the cells are lower than a predetermined voltage, and operates the recirculating unit 130 when it is a normal voltage.

In more detail, the control unit operates the recirculating unit 130, with the recirculating pump 137 operating, the reproducing valve 154 closed, and the switch 157 turned off.

On the contrary, the reproducing valve 154 opens the reproducing pipe 152, the switch 157 is turned on, and the reproducing unit 150 is operated, when a predetermined time passes after the reproducing valve 154 is closed and the recirculating pump 137 is stopped.

Alternatively, the control unit 160 adjusts the water level by selectively opening the drain valve 194 in accordance with the water level in the gas-liquid separator 131.

As described above, the gas-liquid separator 131 selectively communicates with the water tank 180 by the drain pipe 192 while the main fuel cell 110 communicates with the water tank 180 by a drain channel 112 disposed at a side of the main fuel cell 110.

Further, the water collecting unit 158 also communicates with the water tank 180. That is, a water level control pipe 182 and a control valve 184 that control the water level in the water collecting unit 158 are disposed at the left side of the water collecting unit 158.

The water level control pipe 182 communicates with the water collecting unit 158 and the water tank 180 at both ends and the control valve 184 selectively close the water level control pipe 182.

Therefore, the water in the water collecting unit 158 flows into the water tank 180 and is stored therein, in accordance with whether the control valve 184 is open.

Accordingly, all the water in the main fuel cell 110, the water in the gas-liquid separator 131, and the water in the water collecting unit 158 flow into the water tank 180 and are stored therein.

Meanwhile, an air intake pipe 151 is disposed at the right side of the gas-liquid separator that communicates with a channel through which air flow in the main fuel cell.

The air intake pipe 151 guides the air flowing out of the gas-liquid separator 131 into the sacrifice fuel cell 156.

That is, as the reproducing pipe 152 supplying hydrogen into the sacrifice fuel cell 156, the air intake pipe 151 supplies the air containing the oxygen flowing out of the main fuel cell 110 without reacting such that the hydrogen and oxygen react.

Therefore, the air intake pipe 151 is selectively opened, like the reproducing pipe 152, such that the main fuel cell 110 can be reproduced by using the sacrifice fuel cell 156, and for this configuration, a blocking valve 155 is provided in the air intake pipe 151 such that selective opening is possible.

A second exhaust port 159 is disposed at a side of the sacrifice fuel cell 156. The second exhaust port 159 is provided to exhaust the air, which is discharged without reacting in the sacrifice fuel cell 156, to the outside, and functions similar to the first exhaust port 172.

That is, the first exhaust port 172 is provided to exhaust the air passing through the humidifier and the second exhaust port 159 is provided to discharge the air in the sacrifice fuel cell 156.

Therefore, the first exhaust port 172 and the second exhaust port 159 can be selectively operated, and in detail, the first exhaust port 172 is operated when the humidifying unit 175 operates, and the second exhaust port 159 discharges the air when the air intake pipe 151 opens.

That is, the humidifying unit 175 includes a humidifying pipe 176 that guides the air discharged from the gas-liquid separator 131 into the humidifier 170 and a humidification control valve 177 that selectively closes the humidifying pipe 176.

Figure 2:
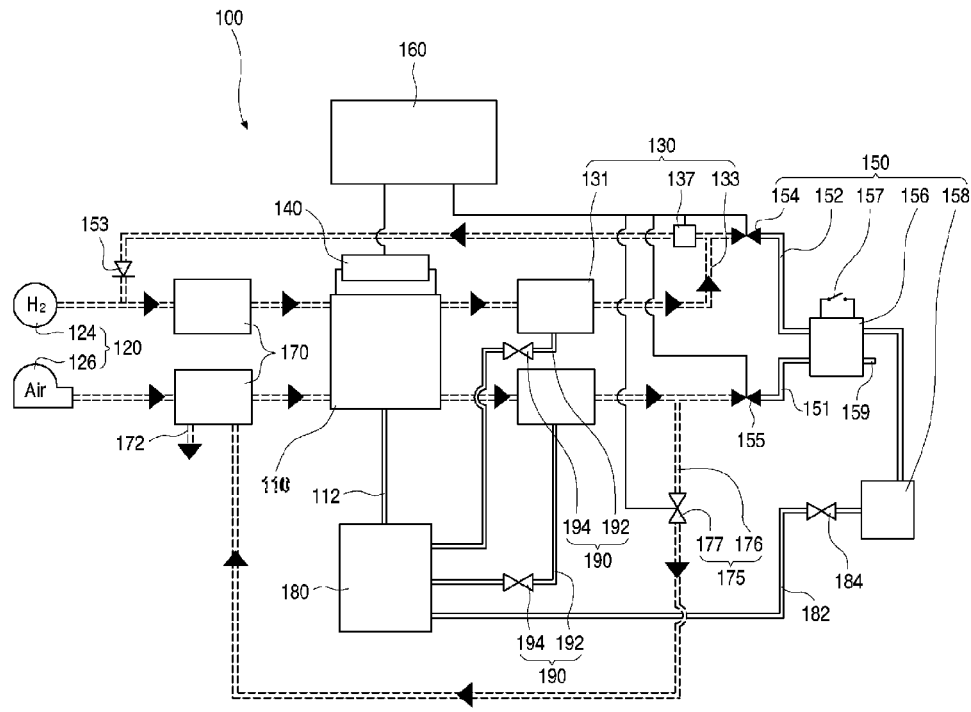
FIG. 2 is a view showing the flow direction of hydrogen and air when a recirculating unit that is a component of the fuel cell system according to an exemplary embodiment of the present invention operates.

The process of generating electricity by operating the open type fuel cell system 100 is described hereafter with reference to the arrows in FIG. 2.

FIG. 2 is a view showing the flow direction of hydrogen and air when a recirculating unit that is a component of the fuel cell system according to an exemplary embodiment of the present invention operates.

As shown in the figure, the supply unit 120 supplies hydrogen and air into the humidifier 170 to allow the open type fuel cell system 110 to generate electricity. The main fuel cell 110 receives the hydrogen and air humidified through the humidifier 170 and generates electricity.

Further, the non-reacting hydrogen in the main fuel cell 110 flows along the recirculating pipe 133 through the gas-liquid separator 131 and the non-reacting moist air flows into the humidifier 170 through the gas-liquid separator 131, and is humidified and then discharged outside through the first exhaust port 172.

In this process, the reproducing valve 154 closes the reproducing pipe 152 to block gas, the blocking valve 155 closes the air intake pipe 151 to block air, and the sensing unit 140 continuously measures the voltages of the cells in the main fuel cell 110. Further, the switch 157 is turned off.

Therefore, the reuse ratio of the hydrogen can be maximized by the operation of the recirculating unit 130.

Figure 3:
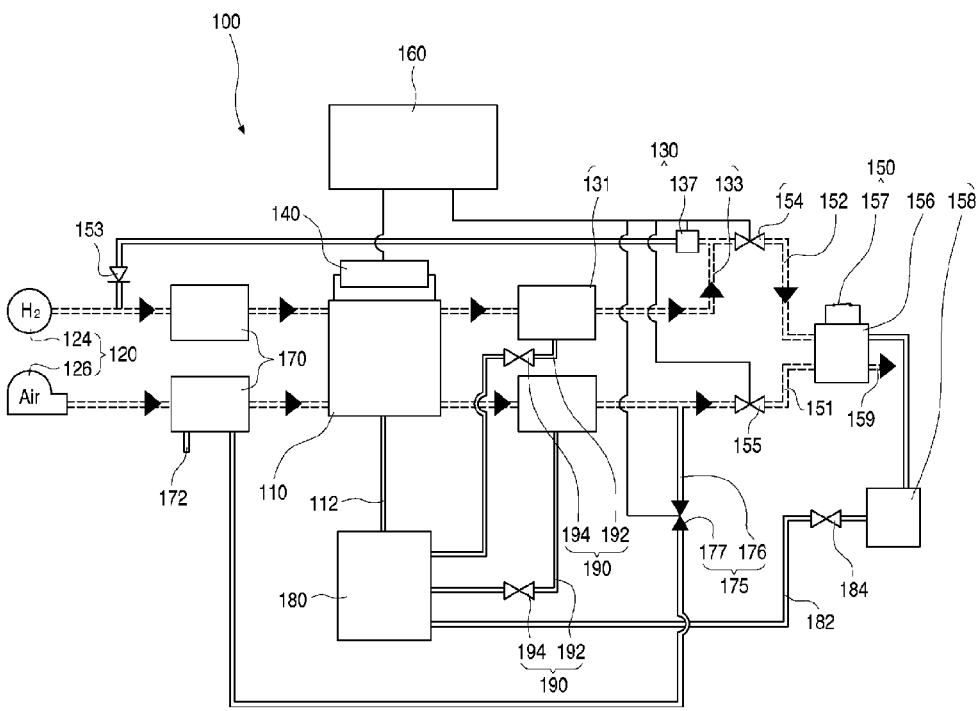
FIG. 3 is a view showing the flow direction of hydrogen and air when a reproducing unit that is a component of the fuel cell system according to an exemplary embodiment of the present invention operates.

The flow of gas when one or more of the voltages of the cells which are sensed by the sensing unit 140 are lower than a predetermined voltage and the reproducing unit 150 is operated is described hereafter with reference to FIG. 3.

FIG. 3 is a view showing the flow direction of hydrogen and air when a reproducing unit that is a component of the fuel cell system according to an exemplary embodiment of the present invention operates.

As shown in the figure, as the efficiency of electric generation of the main fuel cell 110 decreases, the reproducing unit 150 operates and the efficiency of electric generation and durability of the main fuel cell 110 can be increased.

For this configuration, the control unit 160 discharges the water in the main fuel cell 110 to the gas-liquid separator 131 by opening the reproducing valve 154, using the pressure difference, and supplies the reacting hydrogen and impurities to the sacrifice fuel cell 156.

In this operation, the oxygen and hydrogen react into water in the sacrifice fuel cell 156 by turning on the switch 157.

Therefore, the sacrifice fuel cell 156 generates electricity while producing water in the sacrifice fuel cell 156.

The water produced in the sacrifice fuel cell 156 flows into the water collecting unit 158 and is stored therein, and can flow into the water tank 180 by the control valve 184 that is selectively opened.

Further, the non-reacting air in the sacrifice fuel cell 156 is discharged to the outside through the second exhaust port 159.

The water and impurities in the main fuel cell 110 are accumulated in the sacrifice fuel cell 156 by the operation descr4ibed above, such that the impurities in the main fuel cell 110 is reduced and the durability can be correspondingly increased.

Further, since the sacrifice fuel cell 156 produces water by reaching all of hydrogen, it does not discharge hydrogen to the outside.

The present invention is not limited to the exemplary embodiment described above and may be modified in various ways by those skilled in the art on the basis of the present invention without departing from the spirit of the present invention.

For example, although the internal configuration of the main fuel cell is not disclosed in detail in the exemplary embodiment of the present invention, it is apparent to further provide a cooling water channel for increasing the efficiency of electric generation by reducing the amount of heat generated from the main fuel cell.

What is claimed is:

1. An open fuel cell system comprising:
a main fuel cell that generates electricity by reacting hydrogen with the oxygen in the air;
a supply unit that supplies the hydrogen and the air to the main fuel cell;
a recirculating unit that recirculates hydrogen discharged from the main fuel cell to the main fuel cell;
a sensing unit that senses voltage of a plurality of cells in the main fuel cell;
a reproducing unit that selectively communicates with a side of the main fuel cell and removes water and impurities in the main fuel cell;
a humidifying unit that supplies the water in the air discharged from the main fuel cell to the main fuel cell; and
a control unit that controls the operations of the supply unit, the recirculating unit, the sensing unit, the reproducing unit, and the humidifying unit,
wherein the recirculating unit includes:
a gas-liquid separator that separates hydrogen and water produced in the main fuel cell, and
wherein the humidifying unit includes:
a humidifying pipe that guides moist air discharged from the gas-liquid separator into a humidifier that supplies hydrogen and air humidified in the main fuel cell: and
a humidification control valve that selectively closes the humidifying pipe, and
wherein the reproducing unit includes:
a reproducing pipe that guides the flow direction of the hydrogen passing through the main fuel cell;
a reproducing valve that selectively closes the reproducing pipe;

a sacrifice fuel cell that produces water by reacting the hydrogen supplied from the reproducing pipe with air therein;

an air intake pipe that guides air flowing into the sacrifice fuel cell; and a water collecting unit that collects the water produced in the sacrifice fuel cell.

2. The open fuel cell system according to claim 1, wherein the reproducing unit is adapted to change the flow speed of the hydrogen and air discharged without reacting in the main fuel cell to discharge the water and impurities in the main fuel cell.

3. The open fuel cell system according to claim 2, wherein the supply unit includes:

a fuel tank that stores hydrogen and selectively supplies air; and an air supplier that forces the external air to flow into the main fuel cell.

4. The open fuel cell system according to claim 1, wherein the recirculating unit includes:

a recirculating pipe that guides the hydrogen separated from the water by the gas-liquid separator to the main fuel cell; and a recirculating pump that forces the flow of the hydrogen in the recirculating pipe.

5. The open fuel cell system according to claim 4, wherein the reproducing pipe and the recirculating pipe communicate with each other.

6. The open fuel cell system according to claim 4, wherein the water collecting unit and the gas-liquid separator selectively communicate with a water tank storing water.

7. The open fuel cell system according to claim 4, wherein a check valve that blocks the flown of the air in one direction is disposed at a side of the recirculating pipe.

8. The open fuel cell system according to claim 4, wherein the control unit opens the reproducing pipe, when one or more of the voltages of the plurality of cells are lower than a predetermined voltage.

9. The open fuel cell system according to claim 4, wherein a drain that controls a water level by selectively discharge the water stored in the gas-liquid separator is disposed at a side of the gas-liquid separator.

10. The open fuel cell system according to claim 1, wherein the sacrifice fuel cell generates electricity by receiving hydrogen and air and a pair of electrodes that guide current flow are selectively connected.

11. The open fuel cell system according to claim 10, wherein the sacrifice fuel cell has capacity of electric generation smaller than the main fuel cell and is selective replaced.

12. The open fuel cell system according to claim 10, wherein a switch that selectively connects/disconnects a pair of electrodes is disposed at a side of the sacrifice fuel cell and the switch is adapted to be connected when the reproducing valve is opened.

13. The open fuel cell system according to claim 1, wherein an exhaust port is disposed at a side of the sacrifice fuel cell and the humidifier, respectively.

* * * * *